United States Patent [19]

Pepper

[11] Patent Number: 5,557,431
[45] Date of Patent: Sep. 17, 1996

[54] REAL-TIME COMPENSATED IMAGING SYSTEM AND METHOD USING A DOUBLE-PUMPED PHASE-CONJUGATE MIRROR

[75] Inventor: David M. Pepper, Malibu, Calif.

[73] Assignee: Hughes Aircraft Company, Los Angeles, Calif.

[21] Appl. No.: 169,888

[22] Filed: Dec. 16, 1993

[51] Int. Cl.$^6$ .................................................. G03H 1/10
[52] U.S. Cl. ............................... 359/10; 359/7; 359/16; 359/299; 359/300
[58] Field of Search ...................... 359/10, 11, 16, 359/28, 30, 35, 298, 299, 300, 325, 338, 7; 382/31

[56] References Cited

U.S. PATENT DOCUMENTS

| | | | |
|---|---|---|---|
| 4,869,579 | 9/1989 | Fischer et al. | 359/299 |
| 4,879,532 | 11/1989 | Shemwell et al. | 359/27 |
| 4,889,398 | 12/1989 | Elbaum et al. | 359/10 |
| 4,927,251 | 5/1990 | Schoen | 359/364 |
| 4,953,954 | 9/1990 | Ewbank et al. | 359/15 |
| 5,025,488 | 6/1991 | Yeh et al. | 359/10 |
| 5,198,911 | 3/1993 | Ning | 359/15 |
| 5,223,966 | 6/1993 | Tomita et al. | 359/108 |
| 5,258,860 | 11/1993 | Scherer et al. | 359/11 |

OTHER PUBLICATIONS

Fischer et al., "Photorefractive Oscillators", *IEEE Journal of Quantum Electronics*, vol. 25, No. 3, Mar. 1989, pp. 550–569.
Adams et al., "Wide-field-of-view heterodyne receiver using a photorefractive double phase-conjugate mirror", *Optic Letters*, vol. 16, No. 11, Jun. 1, 1991, pp. 832–834.
Chang, "Spatial-Mode cleanup of a pulsed laser beam with mutually pumped phase conjugation with a cw reference", *Optic Letters*, vol. 15, No. 23, Dec. 1, 1990, pp. 1342–1344.
Cronin–Golomb, "Achromatic volume holography using dispersive compensation for grating tilt", *Optic Letters*, vol. 14, No. 23, Dec. 1, 1989, pp. 1297–1299.
Rabinovich et al., "Photorefractive two-beam coupling with white light", *Optics Letters*, vol. 16, No. 10, May 15, 1991, pp. 798–800.
Kong et al., "Experimental study of achromatic volume holography with dispersive compensation in barium titanate", *Optics Letters*, vol. 17, No. 4, Feb. 15, 1992, pp. 297–299.
Cronin–Golomb, "Dynamically programmable self–aligning optical interconnect with fan-out and fan-in using self-pumped phase conjugation", *Applied Physics Letters*, vol. 54, No. 22, May 29, 1989, pp. 2189–2191.
Schamschula et al., "Adaptive optical interconnection", *Optics Letters*, vol. 16, No. 18, Sep. 15, 1991, pp. 1421–1423.

(List continued on next page.)

*Primary Examiner*—Paul M. Dzierzynski
*Assistant Examiner*—Darren E. Schuberg
*Attorney, Agent, or Firm*—V. D. Duraiswamy; W. K. Densow-Low

[57] ABSTRACT

An adaptive optics imaging system uses a double pumped phase conjugate mirror (DPCM) to compensate for phase, amplitude or polarization aberrations imposed upon a multipixel object beam. A remote reference beam is used to sample an aberrating medium through which the object beam is transmitted, and forms a shared hologram in a two-beam coupling medium with a local reference beam having known phase characteristics, generally plane-wave. An output beam is produced in the phase conjugate direction of the local reference beam, with the pixelized difference in phase characteristics between the output and local reference beams corresponding to the pixelized difference in phase characteristics between the object and remote reference beams; the remote reference beam is also preferably planar. The two reference beams have powers substantially greater than the object beam, and the reference beams also preferably have known intensity characteristics that allow aberrations in the object beam's intensity to be compensated. The various beams can be either pulsed or continuous wave, and can be mutually incoherent. Several different filters are described to segregate the object beam component of the output beam from the remote reference beam component.

21 Claims, 5 Drawing Sheets

OTHER PUBLICATIONS

Vieux, "Double-phase conjugated mirror and double color pumped oscillator in photorefractive InP:Fe". *Applied Physics Letters*, vol. 58, No. 25, Jun. 24, 1991, pp. 2880–2882.

Saleh et al., *Fundamental of Photonics*, John Wiley & Sons, 1991, pp. 756–761.

N. G. Basov, et al., *JETP Letter*, 28, 1978, pp. 197–201.

REAL-TIME COMPENSATED IMAGING SYSTEM AND METHOD USING A DOUBLE-PUMPED PHASE-CONJUGATE MIRROR

BACKGROUND OF THE INVENTION

1. Field of the Invention

This invention relates to the use of real-time holographic (RTH) compensated imaging, and more particularly to compensated imaging using a double-pumped phase-conjugate mirror (DPCM).

2. Description of the Related Art

The DPCM is a new type of phase conjugate mirror (PCM) that has been developed over the past few years. Unlike prior PCM systems, in which the input beams had to be mutually coherent, the DPCM is capable of coupling mutually incoherent beams in a bidirectional, dynamic holographic link. The basic operation of a DPCM is illustrated in FIG. 1, in which a pair of mutually non-coherent input beams 2 and 4, which may be generated by respective lasers, are applied at different angles at a two-beam photorefractive coupling medium 6, typically barium titanate ($BaTiO_3$). The two beams establish an optical grating within the crystal 6, with the input beam 2 emerging as an output beam 8 in a direction opposite to beam 4; input beam 4 emerges as an output beam 10 in a direction opposite to beam 2. Output beam 8 has the spatial profile of the phase conjugate of beam 4, but retains the spectral properties of input beam 2. Similarly, output beam 10 assumes the spatial profile of the phase conjugate of input beam 2, but retains the spectral properties of input beam 4. When input beams 2 and 4 are of the same wavelength, the output beams 8 and 10 are parallel to the input beams. In a variation referred to as a double color-pumped PCM, the input beams 2 and 4 have different wavelengths, and the output beams 8 and 10 are offset respectively from beams 4 and 2 by equal non-zero angles.

A general discussion of DPCMs and other photorefractive oscillators is provided in Fischer et al., "Photorefractive Oscillators", IEEE Journal of Quantum Electronics, Vol. 25, No. 3, March 1989, pages 550–569. A specific application of the DPCM to heterodyne detection is discussed. This is a temporal detection scheme that uses a DPCM, with two input beams, to generate a local oscillator beam whose wavefront is matched to an incoming beam that is temporally modulated. An experimental demonstration of Fischer et al.'s DPCM heterodyne detection system, with an added self-pumped conjugator for improved wavefront matching and auto-aligning, is described in Adams et al., "Wide-field-of-view heterodyne receiver using a photorefractive double phase-conjugate mirror", Optics Letters, Vol. 16, No. 11, Jun. 1, 1991, pages 832–834.

A DPCM has also been proposed for beam cleanup in a pulsed laser system, Chang, "Spatial-mode cleanup of a pulsed laser beam with mutually pumped phase conjugation with a cw reference", Optics Letters, Vol. 15, No. 23, Dec. 1, 1990, pages 1342–1344. A DPCM is used to provide shared gratings with a distorted pulsed laser beam and an undistorted reference cw beam. Only two beams are used: the distorted pulsed beam and the "clean" reference cw beam. There is no spatial or temporal modulation, or other encoding, of the pulsed beam.

Systems have also been proposed for various achromatic beam coupling systems in photorefractive crystals. The use of gratings in photorefractive crystals for an achromatic operation is proposed and modeled in Cronin-Golomb, "Achromatic volume holography using dispersive compensation for grating tilt", Optics Letters, Vol. 14, No. 23, Dec. 1, 1989, pages 1297–1299. White-light two-beam coupling in photorefractive crystals is demonstrated, using Cronin-Golomb's proposal, in Rabinovich et al., "Photorefractive two-beam coupling with white light", Optics Letters, Vol. 16, No. 10, May 15, 1991, pages 798–800. The use of two-beam coupling with achromatic gratings is discussed, and its effect on different read and write laser wavelengths is evaluated for barium titanate, in Kong et al., "Experimental study of achromatic volume holography with dispersive compensation in barium titanate", Optics Letters, Vol. 17, No. 4, Feb. 15, 1992, pages 297–299. In each of these publications only two input beams are considered, and no spatial or temporal modulation or other encoding of the inputs is discussed.

Another proposed application is for DPCM optical interconnects, with a beam fan-in and fan-out capability using a strontium barium niobate crystal, Cronin-Golomb, "Dynamically programmable self-aligning optical interconnect with fan-out and fan-in using self-pumped phase conjugation", Applied Physics Letters, Vol. 54, No. 22, May 29, 1989, pages 2189–2191. The ability to transfer modulated information from a number of input ports to various combinations of output ports is described. Multiple local beam sources and multiple remote beam sources are used to write gratings in the crystal. The remote beams are assumed to be out-of-phase with each other, and the local beams are also assumed to be out-of-phase with each other. The proposed system segregates each input beam to a corresponding single or multiple set of output beams for applications such as neural networks, and image transmission through thick distortion media. For the image transmission application, the system sequences through a training cycle on a pixel-by-pixel basis. One concern of this system is that, unless the gratings for the various pixels are properly registered relative to each other, the overlap of gratings from different pixels causes artificial phase shifts between successive pixels. The proposed solution, which is to train two beam pixels at a time and to overlap successive training pairs, has the drawback of reducing the output resolution. Furthermore, because it is restricted to processing only one pixel at a time, or at best overlapping sequential pairs of pixels, this approach is not applicable to real-time processing of multiple-pixel images.

An approach similar to that described in the Cronin-Golomb Applied Physics Letters article is disclosed in Schamschula et al., "Adaptive optical interconnection", Optics Letters, Vol. 16, No. 18, Sep. 15, 1991, pages 1421–1423. A DPCM is used to compensate for thermal, vibrational and other environmental aberrations by establishing bidirectional beam fan-in, fan-out optical interconnections. This on-axis system uses beam transmission holograms, along with a dual-wavelength operation, for a simple and high throughput system. As with Cronin-Golomb, the input beams are basically treated as single-pixel beams, without multi-pixel modulation. The use of a DPCM to couple two different infrared lasers together in a InP:Fe crystal has also been reported, in Vieux, "Double-phase conjugated mirror and double color pumped oscillator in photorefractive InP:Fe", Applied Physics Letters, Vol. 58, No. 25, Jun. 24, 1991, pages 2880–2882.

Despite the work that has been done with DPCMs, there have been no proposals for a real-time adaptive optics system for removing aberrations picked up during the transmission of an image bearing beam. Adaptive optics systems capable of correcting for phase aberrations acquired during the transmission of an image-bearing beam are known, but such systems require that at least two of the beams used be mutually coherent. In practice, this is quite difficult to achieve, and imposes significant design restrictions. Moreover only phase aberrations have been compensated; in general, path distortions can result in both phase as well as amplitude distortion upon transmission. In one approach, counter-propagating pump beams are applied to a four-wave mixing medium, and a probe beam is also directed onto the mixer after being transmitted through an aberrating medium. An image is placed on one of the pump beams and transferred in the mixing medium to the probe beam, so that the conjugate of the probe beam transmitted back through the aberrating medium bears the image and has the aberrations removed during the reverse transit. Four-wave mixing in general is described in Saleh et al., *Fundamentals of Photonics*, John Wiley & Sons, 1991, pages 7561∝761. The system will only work, however, if the image-bearing pump beam is coherent with the probe beam.

Another prior adaptive optics technique is to transmit a reference beam and an image-bearing beam through an aberrating medium, and then use the two aberrated beams to write a hologram. The aberrations of the two beams in effect cancel, and a third beam is used to read out the undistorted image from the hologram. This technique requires that the original reference and image-bearing beams be mutually coherent.

SUMMARY OF THE INVENTION

The present invention seeks to provide an adaptive optical imaging system and method that is capable of compensating in real time for transmission-induced phase, amplitude and polarization aberrations imposed on a multi-pixel object beam, without the need for maintaining mutual coherence between different beams, and that is capable of wide field-of-view processing, high spatial resolution and high diffraction efficiency.

The invention employs a DPCM approach to achieve these goals. A remote reference beam is directed through an aberrating medium onto a two-beam coupling medium, where it forms a shared hologram with a local reference beam (which need not be coherent with respect to the remote reference beam) that has known phase characteristics. A multi-pixel object beam (which need not be coherent with respect to either or both of the reference beams) is also transmitted through the aberrating medium, on a path similar to that of the remote reference beam, to the hologram. The coupling medium responds to the object beam with a multi-pixel output beam in the phase conjugate direction of the local reference beam. The pixelized difference in phase characteristics between the output and local reference beams corresponds to the pixelized difference in phase characteristics between the object and remote reference beams, regardless of the aberrations imposed upon the object and remote reference beams. The object beam's original phase and amplitude characteristics can thus be recovered; the remote and local reference beams are preferably plane waves for this purpose. In a similar manner, the original intensity characteristics of the object beam can be recovered based upon the known intensity characteristics of the local reference beam.

The remote reference beam is preferably substantially more intense than the object beam, so that the hologram is formed principally by the remote and local reference beams.

When the aberrating medium is varying, the remote reference beam is preferably pulsed at a higher frequency than the aberrating variation to refresh the hologram, or is intense enough to form gratings fast enough to "track" the propagation distortions.

The remote reference and object beams can be applied to the hologram either simultaneously, or in alternating time periods. When they temporally overlap on the hologram, a filter is provided in the path of the output beam to remove its remote reference component, while preserving an object beam component. This can be accomplished with a spatial stop filter, a notch filter when the spectrum of the remote reference beam is substantially narrower than that of the object beam, an optical shutter when the remote reference beam is pulsed, or via polarization separation of the beams.

When the object beam is a broad band beam with a number of narrow band components, separate remote and local reference beams can be generated at the same narrow bands. Separate holograms are formed by the remote and local reference beams on the coupling medium, with each hologram established by beams within a common frequency band. A beam combiner then combines the output beams from each of the shared holograms.

The described adaptive optics system can be used for object beam cleanup even if the reference beams and the object beam are all mutually incoherent; this allows for a considerable reduction in complexity as compared with prior adaptive optics systems. Polarization distortions, as well as path distortions in long, multi-mode optical fibers, can also be compensated. Further features and objects of the invention will be apparent to those skilled in the art from the following detailed description, taken together with the accompanying drawings.

DETAILED DESCRIPTION OF THE INVENTION

Figure 1:
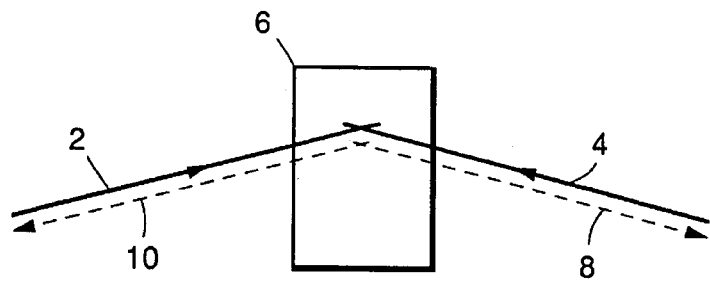
FIG. 1 is a block diagram of a basic DPCM configuration, described above.
Figure 2:
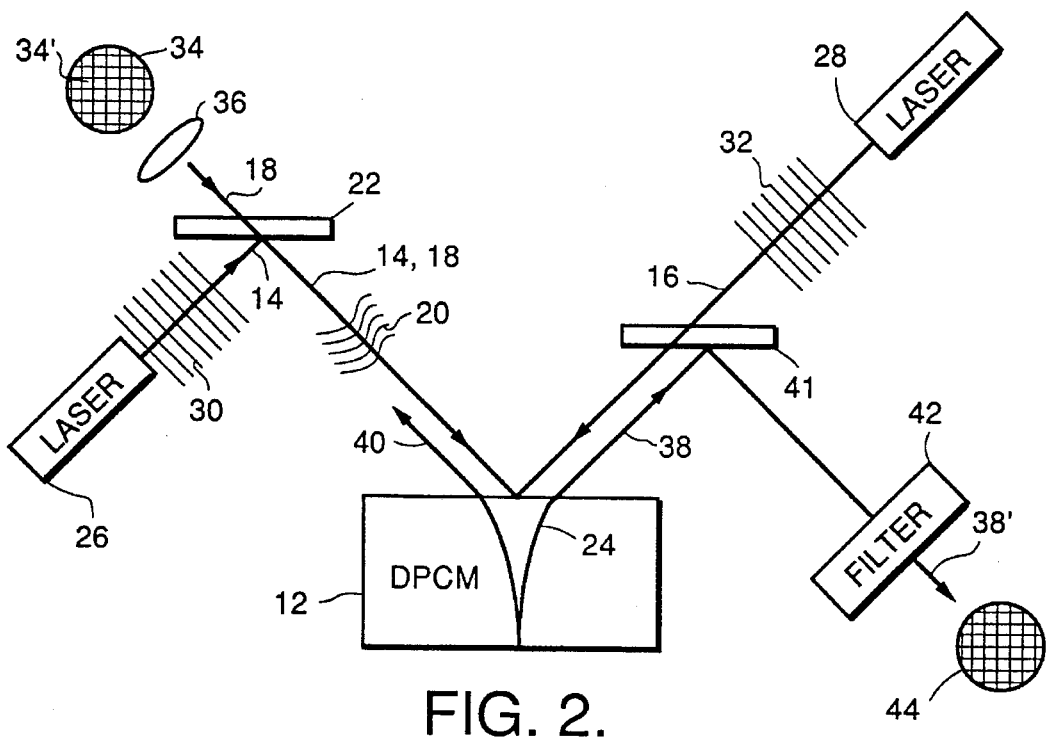
FIG. 2 is a block diagram of an adaptive optics system in accordance with the invention.

A block diagram of a basic system that utilizes the invention is shown in FIG. 2. It consists of a non-linear photorefractive crystal 12, or other two-beam coupling medium, that is illuminated by three beams.

The photorefractive effect has been observed (with demonstrated conjugators, including self-pumped PCMs and, in some materials double-pumped conjugators) in the following materials at the noted wavelengths: barium titanate, throughout the visible and into the near infrared (0.4 μm to 1.08 μm); strontium barium niobate, bismuth titanium oxide, and bismuth silicon oxide all in the visible and near infrared; gallium arsenide (in the near infrared); indium phosphide (in the near infrared at 1.32 μm). Two-beam coupling, with possible application to double-pumped conjugation (phase conjugation has been demonstrated, but not double-pumped conjugation as of the present time), has been observed in sodium and cesium atomic vapors, liquid crystals, resonant media in ruby crystals, and via stimulated scattering (stimulated Brillouin scattering, stimulated Raman scattering, stimulated Rayleigh scattering).

The beams do not need to be applied at the same time, nor do they need to be mutually coherent. The three beams are a remote reference beam 14, a local reference beam 16 and a remote object beam 18. The remote reference beam 14 and object beam 18 are transmitted along similar paths through an aberrating medium 20, such as a turbulent atmosphere, optical fiber bundle, poor-quality telescope or microscope. The two beams can be combined along a single path through the aberrating medium by conventional optical directional apparatus, such as a beam splitter 22 or a polarization element.

The remote and local reference beams 14 and 16 are directed from different angles onto the photorefractive medium 12 to form a shared hologram (grating) 24 within the medium, based upon the interference pattern between the two beams. The term "remote" as used herein means that a beam must be transmitted through the aberrating medium 20 to reach the photorefractive medium 12, and that the beam's wavefront when it reaches the photorefractive medium is not known in advance. The term "local" as used herein means that a beam does not pass through the aberrating medium to reach the photorefractive medium 12, and that its wavefront characteristics at the photorefractive medium are generally known.

The remote and local reference beams 14 and 16 in the illustration of FIG. 2 are generated by respective lasers 26 and 28. The initial wavefronts 30, 32 of the remote and local reference beams are known, and typically will be planar. However, the beam wavefronts can be varied from planar if desired, such as using a converging local reference beam 16 to produce a diverging output image for projecting onto a screen; other wavefront patterns could be employed for other desired display or imaging purposes.

The object beam 18 bears the pixelized image of a source object 34, which is represented in FIG. 2 as being subdivided into an array of individual pixels 34'. The object beam can have either an active source, such as a laser, or a passive source such as broad band solar light that is reflected off the object 34 and shaped into a beam by lens 36. Either 2-D or 3-D imaging can be provided.

The two reference beams 14 and 16 form a set of complex shared gratings as they undergo the well-known fanning process, due to stimulated forward scattering interactions in the coupling medium 12. Once the shared gratings are formed by the reference beams, the coupling medium 12 functions as a DPCM to diffract each of the reference beams into the phase-conjugate direction of the other, free of common-path errors. Thus, output beams 38 and 40 are established in the phase conjugate directions of the local and remote reference beams 16 and 14, respectively. This operation is also called an optical interconnect process, since photons from each input reference beam are directed into the wavefront-reversed direction of the other beam (and vice versa). The output beam 40 in the phase conjugate direction of the remote reference beam 14 is not used in the invention. It can, however, be used to assist in forming a remote reference by reflecting it from a dominant "glint" feature at or near the object.

It can be shown from the basic DPCM operation that each of the conjugate beams 38 and 40 are faithful replicas of their respective source beams 14 and 16, and are free of image information contained in the other conjugate beam; the two conjugate output beams are thus free of cross talk. This is unlike conventional holography, in which amplitude information recorded in a hologram can be imprinted onto a readout beam. This feature enables the present system to function more efficiently (in terms of fidelity to the compensated output beam) than conventional holographic compensators, since phase as well as amplitude and polarization distortions present in the remote reference beam are removed as its photons are directed into the conjugate direction of the local reference.

The photons from the remote reference beam 14 are diffracted into the output beam 38 that travels in the phase conjugate direction of the local reference beam 16. With the local reference beam chosen to have a plane-wave, the coupling medium 12 effectively "cleans" or "scrubs" the remote reference beam. The DPCM thus effectively forms a matched filter, so that both amplitude and phase distortions sampled by the remote reference beam 14 are filtered out by the DPCM.

To keep the image-bearing object beam from writing its own gratings, it should have a power level substantially less than that of either the remote or local reference beams. The absolute power levels will vary with different coupling media and frequency ranges. A $BaTiO_3$ crystal is preferred for the visible portion of the spectrum, with local and external reference beam energies on the order of 1 watt/cm$^2$. In this case, the object beam power should preferably be less than 1 mW/cm$^2$. Other two-beam coupling crystals that can be used for visible wavelengths are $Bi_{12}SiO_{20}$ and $Bi_{12}TiO_{20}$. For infrared radiation, semiconductor compounds such as GaAs, InP and CdTe are suitable.

The multi-pixel phase conjugate output beam 38 is segregated from the local reference beam 16, such as by the use of a beam splitter 41, and is then processed through a filter 42 to remove its remote reference beam component. Only that portion of the output which corresponds to the object beam 18. The filtered output beam 38', depicted in FIG. 2 as bearing a multi-pixel image 44, has pixelized phase characteristics that differ from the phase of the local reference beam 16 in a manner that corresponds to the pixelized difference in phase characteristics between the object and remote reference beams, prior to their being transmitted through the aberrating medium 20. Thus, if the remote and local reference beam wavefronts 30 and 32 are both planar, the pixelized phase characteristics of the output image 44 will be essentially the same as those of the original object beam 18 before aberration. In this manner the phase characteristics of the original object beam can be recovered, even though the amount of aberration to which it is subjected at any particular time is unknown.

The original intensity characteristics of the object beam prior to aberration can also be recovered with this system. In a manner similar to the phase differences, the final output beam 38' has a pixelized intensity characteristic that differs from the intensity characteristic of the local reference beam by an amount that corresponds to the intensity difference between the object and remote reference beams. Thus, if the intensity characteristics of the remote and local reference beams are known and matched, the pixelized intensity characteristics of the final output beam 38' will generally replicate those of the original image 34. A uniform intensity characteristic for both the remote and local reference beams is generally most convenient for this purpose.

Figure 3A:
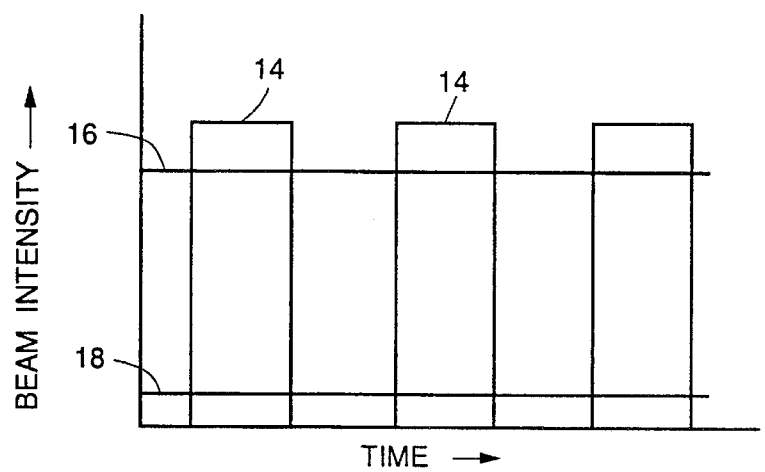
FIGS. 3a, 3b and 3c are graphs illustrating different possible time relationships among the remote reference, local reference and object beams used with the invention.

All three input beams to the DPCM can be on continuously, or any one or more of them can be pulsed. FIG. 3a represents the situation in which the local reference and object beams 16 and 18 are continuous wave (cw), while the remote reference beam 14 is pulsed. In this case, the pulse frequency of the remote reference beam should be greater than the characteristic frequency at which the aberrating medium varies. For example, if the object and remote reference beams are transmitted through a turbulent atmosphere and it is assumed that the turbulence changes significantly each millisecond, the pulse rate for the remote reference beam 14 should be at least 1 kHz.

Figure 3B:
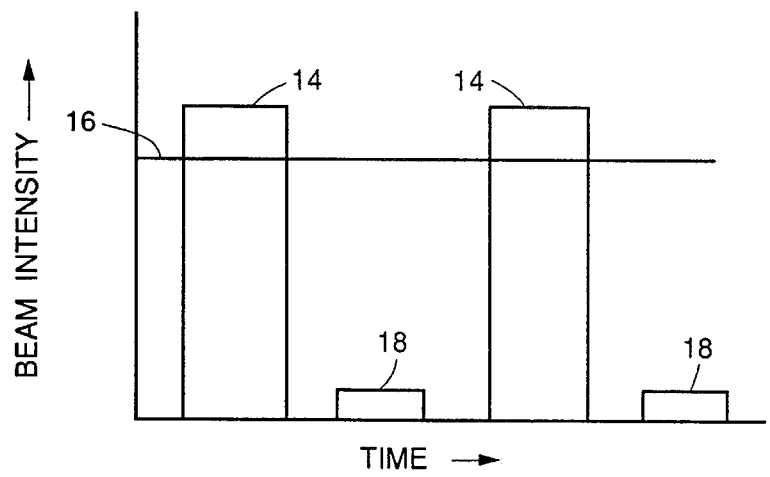
Figure 3C:
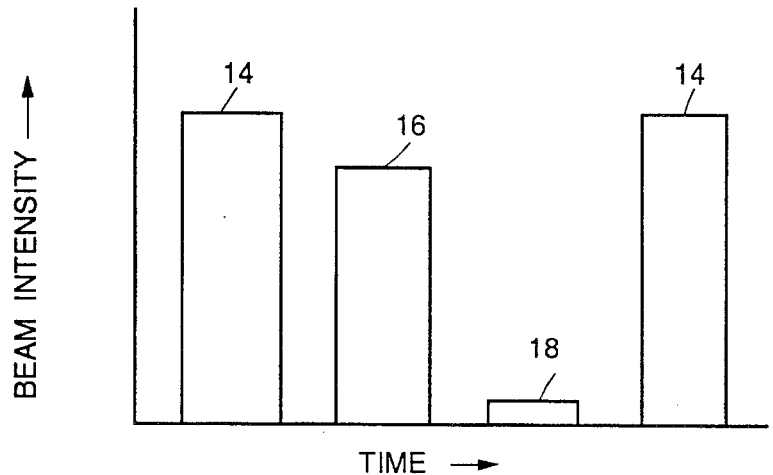

FIG. 3b illustrates the situation when the local reference beam 16 is cw, and both the remote reference and object beams 14 and 18 are pulsed. All three beams can also be pulsed, as illustrated in FIG. 3c, such as when the remote reference beam is provided from a satellite. In this case the local and remote reference beam pulses should not be separated by more than the grating response time of the two-beam coupling medium.

One of the distinct advantages of the invention is that, in addition to not requiring mutual coherency between the beams, the manner in which they vary over time relative to each other also need not be precise. The various beams can either temporally overlap or be segregated from each other, so long as the remote reference beam is turned on frequently enough to refresh the grating for variations in the aberrating medium, and the local and remote reference beams are applied close enough to each other in time to form the gratings in the first place.

The filter 42 can take several different forms, depending upon the pulsed or cw nature of the beams, their frequency characteristics, or their polarizations. Where the remote reference beam is pulsed and the object beam is either cw or pulsed on at different times from the remote reference beam, the filter can be provided as an optical shutter in the path of either the remote reference beam or the output beam. A shutter control would respond to the remote reference beam source to close the shutter during the remote reference beam pulses, and to open the shutter between pulses. This approach is useful for applications, such as medical systems, in which all of the beams are generated in the same area. When the remote reference beam has a spectral bandwidth substantially narrower than the object beam's bandwidth, the filter 42 can be provided as a notch filter to remove the remote reference beam's spectral band from the output.

Figure 4:
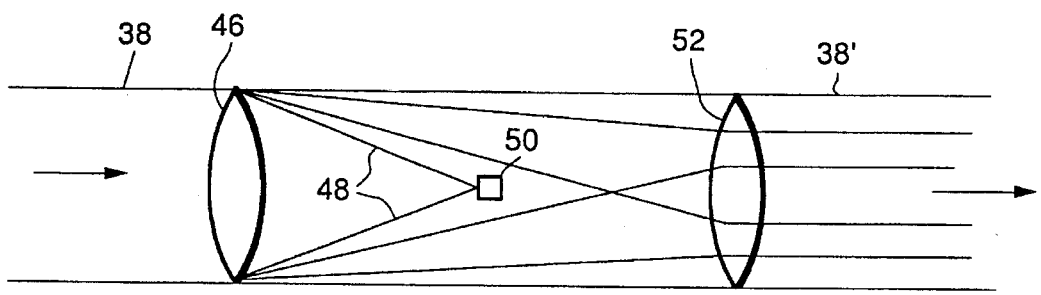
FIG. 4 is a block diagram of a spatial filter that can be used to remove the remote reference component from the readout beam when the remote reference and object beams overlap in time.

If all three beams are cw, or are at least pulsed on for overlapping time periods, the filter 42 can be implemented as a spatial stop filter that transmits all but that spatial portion of the output beam which corresponds to the remote reference beam. This type of filter is illustrated in FIG. 4. Assume that the remote reference beam 14 is generated as a plane wave. Passing the output beam 38 through a focusing lens 46 will cause its plane-wave component to be focused to a central dot, as illustrated by rays 48. Placing a block 50 at the lens focal point blocks this plane-wave component associated with the remote reference beam, while all of the non-plane-wave components associated with the object beam are transmitted past the block 50. A downstream lens 52 restores the transmitted portion to a collimated output beam 38'. Spatial stop filters per se are known, but their use with the present invention provides an added degree of flexibility in the type of input beams that can be accommodated.

Figure 5:
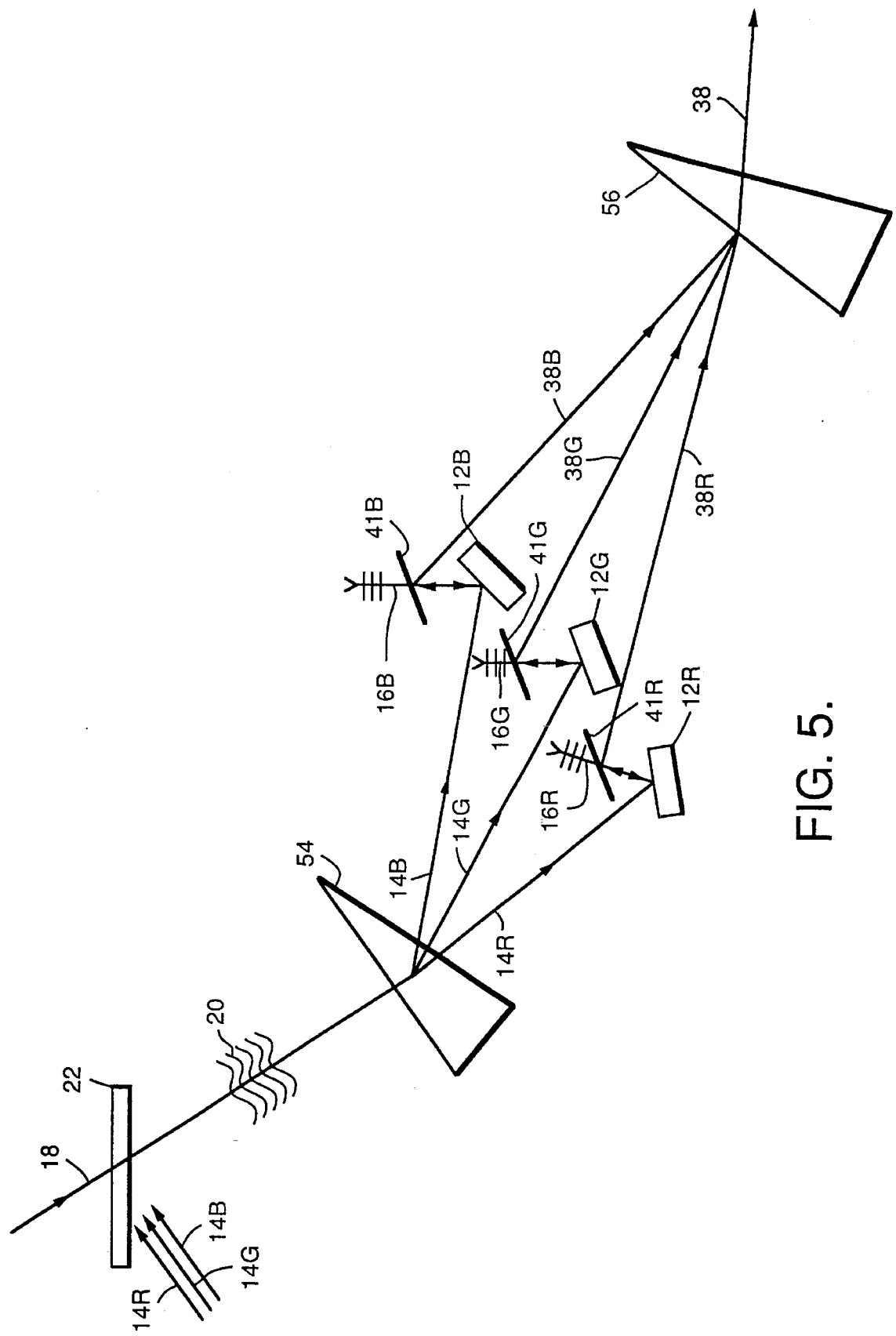
FIG. 5 is a block diagram of a broad band variation of the invention.

For a large field-of-view images, several angularly displaced remote reference beams can be used to sample the full extent of the object; this technique is used in existing adaptive optical compensation systems. For images that are illuminated with broad band light, i.e., sunlight, an achromatic configuration can be used to diffract information from various spectral components that enter the DPCM, using a multi-spectral set of reference beams. This is illustrated in FIG. 5, in which the object beam 18 is assumed to have a broad band spectral characteristic. A number of remote reference beams are provided at mutually spaced portions of the spectrum, such as a red beam 14R from a semiconductor laser, a green beam 14G from a doubled YAG laser, and a blue band 14B from an argon laser (for a large beam) or a solid state upconversion laser (for a smaller beam). The three remote reference beams are transmitted through the aberrating medium 20 on paths similar to the object beam 18, and thereby sample the same aberrations. Upon reception they are divided back into their original spectral components by a prism 54 or other suitable device, and directed onto respective two-beam coupling media 12R, 12G and 12B. In general, different types of photorefractive crystals can be used to best respond to the different wavelength bands of interest. Although these media are illustrated as being separate, they can also be provided at spaced locations on a common photorefractive crystal.

Three separate sets of shared gratings are formed in the two-beam coupling media by the separated reference beams 14R, 14G, 14B and respective red, green and blue local reference beams 16R, 16G, 16B. The red, green and blue components of the object beam 18 are directed by the prism 54 in a similar fashion onto the three gratings, producing compensated output beams 38R, 38G, 38B. Another prism 56 is preferably provided in the path of these three beams to recombine them into a single output beam 38. This beam can then be filtered if desired by any of the techniques described above.

In addition to filtering out phase and amplitude distortions sampled by the remote reference beam, polarization distortions can be filtered out with the use of a technique known in the art and described in N. G. Basov, et al. *JETP Letter* 28, 1978, pages 197–201. This involves deflecting the portions of the object and remote reference beams that are not in the same plane of polarization as the local reference beam, and rotating the polarization of the deflected portions so that they are coplanar with the local reference beam polarization.

It has been assumed thus far that the remote reference beam which probes the distortions medium, and subsequently forms the mutual gratings with the local reference beam in the DPCM, is remotely generated. In some cases, such as space applications, a remotely situated reference optical source may not exist or be easily obtained. Thus, there is a need to generate such a remote reference by some other means. One approach is to illuminate a broad region of space which contains the object that is to be imaged with the compensation system, using a laser which is co-located with the DPCM. Some of the light that strikes the object will reflect from a small, highly reflective feature on the object and find its way back to the DPCM. Many objects will possess such small features, called "glints", which are sub-diffraction-limited. Thus, the glint takes the place of the remote reference beam source 26, with the reflected light sampling the propagation path. The general idea of such glint referencing is known in the art. The novel aspect for the invention is to use the DPCM to receive the light scattered by the glint, and to form a shared grating with it and the local reference. Optical amplification will normally be required to intensify the weak glint beam so that it can efficiently write a mutual grating in the photorefracitve crystal with the local reference.

It should be recalled at this point that the DPCM not only directs the remote reference photons into the direction 38 of the incoming local reference beam; it also directs the local reference beam into the direction 40 of the incoming (distorted) remote reference beam. This second outgoing beam 40 (which can be amplified by the same laser amplifier that amplified the incoming remote reference beam) finds its way back to the same glint feature on the object from which it emanated. The result is that additional light then reflects from the glint feature and again samples the propagation path, with a portion of it finding its way back to the DPCM; the process then repeats once again. This procedure allows a continuous updating of the remote reference beam as the atmosphere changes, thereby "tracking" the object, and maintaining light on the glint.

Since the glint is on the object itself, various forms of imaging error can be avoided. For example, "isoplanatic" errors, which result from a remote reference sampling the atmosphere in regions that differ from the path of the light that illuminates the object as a whole (which may be a broad-spectral-band solar, passive source) can be circumvented using this approach. The idea of using glints for localized referencing and tracking is known; the novelty for purposes of the invention is the use of a DPCM to generate the required beam that, in essence, finds and tracks the object. Once the shared gratings are formed, broadband light that illuminates the object and finds its way into the DPCM will be corrected for path errors, resulting in a compensated image output from the system.

Figure 6:
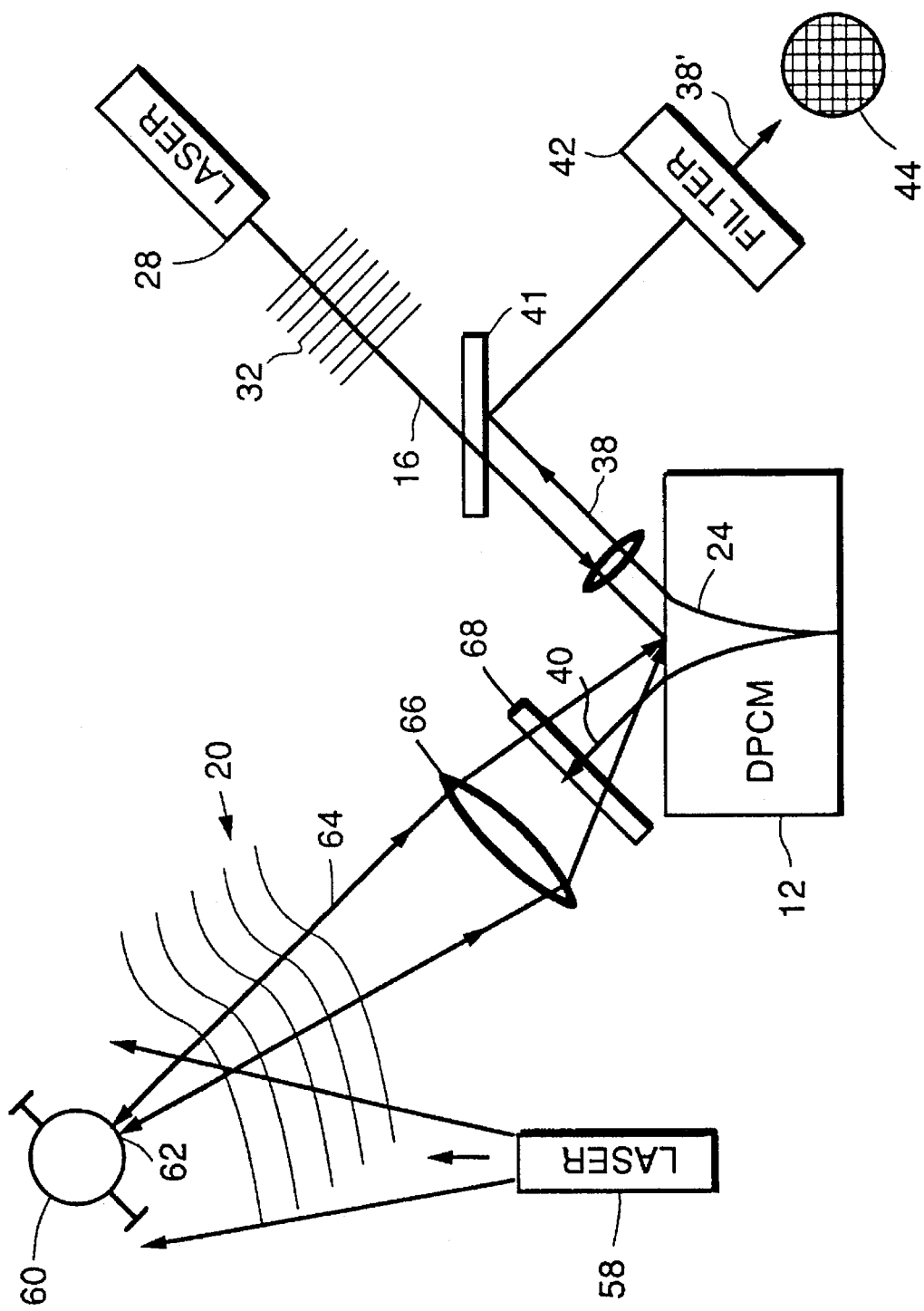
FIG. 6 is a block diagram of an embodiment in which the remote reference source is provided from a local laser that illuminates a glint feature on the object.

The use of a glint feature on the imaged object to provide a remote reference beam is illustrated in FIG. 6, in which elements that are the same as in FIG. 2 are identified by the same reference numbers. A laser 58 at the DPCM location illuminates a region of space in which the object 60 with glint feature 62 is located. The reflected laser light 64 from the glint feature travels through the atmosphere 20 and is focused by a lens 66 through an amplifier 68 onto the DPCM 12.

Figure 7:
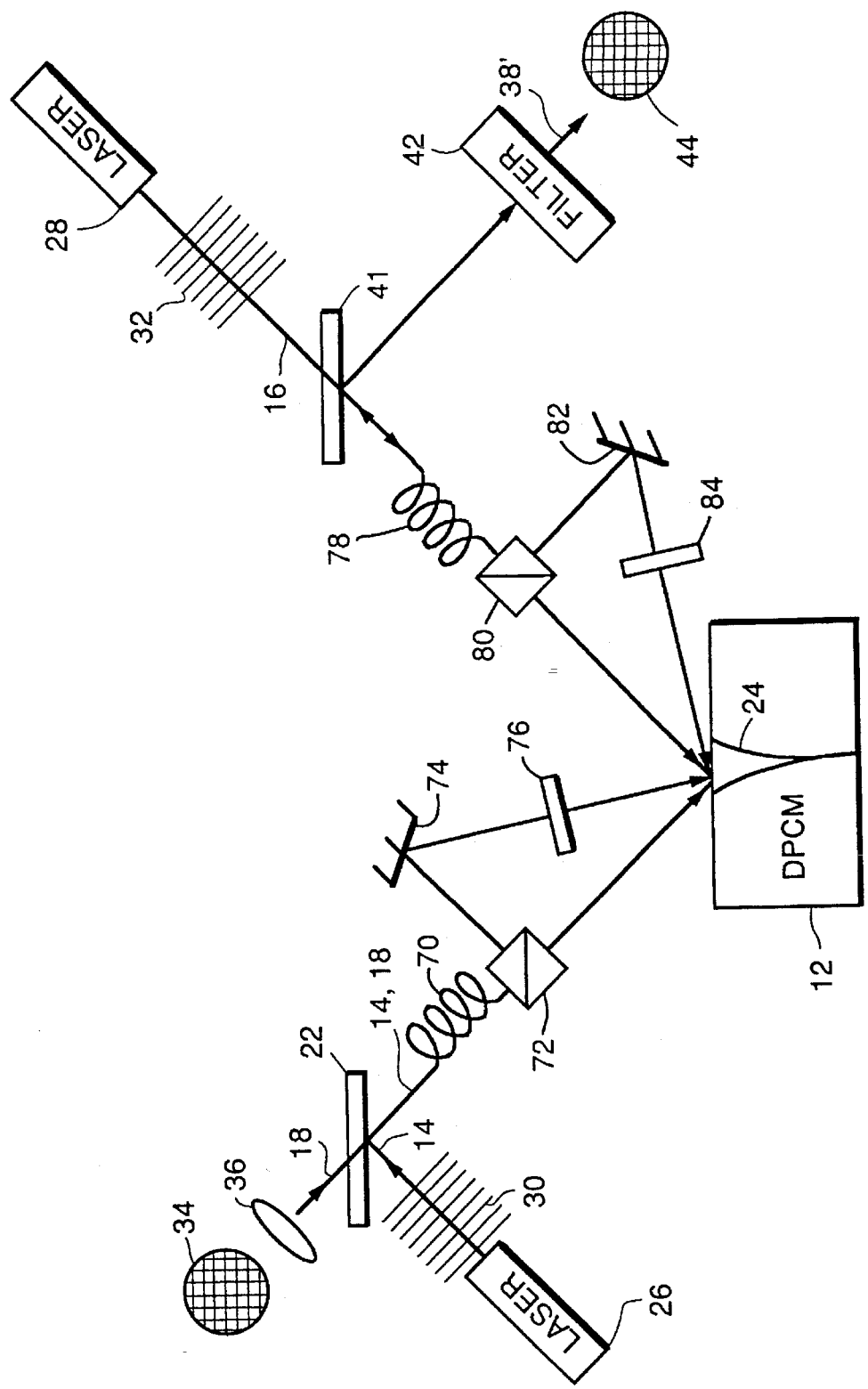
FIG. 7 is a block diagram of an embodiment in which the invention is used to compensate for modal dispersion and depolarization in fiber imaging systems.

The DPCM system can be used to compensate for modal dispersion and depolarization in fiber imaging systems, using the scheme shown in FIG. 7. A fiber 70 to be compensated can consist of a single, long multimode fiber, a collection (i.e., a bundle) of single-mode or multimode fibers, which can either be coherently or incoherently packaged, i.e., each end of the bundle is either a perfect mapping of the other end or is randomly tied to the other end. A polarization compensator consisting of a polarizing beam splitter 72, mirror 74, and half-wave plate 76 is provided between the fiber 70 and the DPCM 12. The use of this combination of optical elements in the case of self-pumped conjugators is known. However, its implementation in a DPCM is new. The fiber 70 can be viewed as a distributed propagation-path error, causing mode scrambling, depolarization, and modal dispersion, which together degrade the image 34. Using a remote reference 26 to sample the fiber distortions, coherent as well as incoherent illuminated objects can be imaged through the fiber 70 using the same DPCM concept described above.

A second fiber 78, which can also be a single, long multimode fiber or a bundle of single-mode or multimode fibers, and a corresponding depolarization compensation system consisting of polarizing beam splitter 80, mirror 82 and half-wave plate 84 can be positioned in the path of the local reference beam 16 for several reasons. First, in conjunction with the first fiber 70 and compensation system 72, 74, 76, image information can be relayed from one fiber into a second fiber. Thus, the DPCM can function as an interconnection coupler between the two fibers, which need not be identical. Second, images can also be relayed in both directions in a manner similar to object 34, by providing an image at the other end of fiber 78. Third, the fiber 78 creates a distorted local reference beam for the DPCM, as opposed to a "clean" wavefront. The presence of a distorted beam produces more sets of shared gratings in the DPCM, which can result in less "crosstalk" of image information. It is speculated that this arrangement will result in cleaner images emerging at the output of the system from the beam splitter 41. Such a fiber-induced image-fidelity enhancer, along with the compensation system 80, 82, 84 for depolarization compensation, has general use and may be employed to augment any of the other embodiments described above.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. An adaptive optical imaging system, comprising:

a two-beam coupling medium, a remote reference beam source for directing a remote reference beam through an aberrating medium to said coupling medium, said aberrating medium having a characteristic frequency at which its degree of aberration varies, wherein said remote reference beam source pulses the remote reference beam at a frequency higher than the aberrating medium's characteristic frequency to refresh said hologram at said higher frequency, a local reference beam source for directing a local reference beam having known phase and intensity characteristics into said beam coupling medium to establish therein a shared hologram with said remote reference beam, and an object beam source for directing a multi-pixel object beam, that contains image information corresponding to an object, through said aberrating medium to said hologram on a path similar to said remote reference beam, said object beam diffracting from said two-beam coupling medium into a multi-pixel output beam in the phase conjugate direction of the local reference beam, said output beam retaining said image information, and wherein the pixelized difference in phase and intensity characteristics between the output beam and the local reference beam corresponds to the pixelized difference in phase and intensity characteristics between the object beam and the remote reference beam, said local reference beam and said remote reference beam establishing said shared hologram independent of said object beam.

2. An adaptive optical imaging system, comprising:

a two-beam coupling medium, a remote reference beam source for directing a remote reference beam through an aberrating medium to said coupling medium, a local reference beam source for directing a local reference beam having known phase and intensity characteristics into said beam coupling medium to establish therein a shared hologram with said remote reference beam, and an object beam source for directing a multi-pixel object beam, that contains image information corresponding to an object, through said aberrating medium to said hologram on a path similar to said remote reference beam, said object beam diffracting from said two-beam coupling medium into a multi-pixel output beam in the phase conjugate direction of the local reference beam, said output beam retaining said image information, and wherein the pixelized difference in phase and intensity characteristics between the output beam and the local reference beam corresponds to the pixelized difference in phase and intensity characteristics between the object beam and the remote reference beam, said local reference beam and said remote reference beam establishing said shared hologram independent of said object beam, and further comprising a filter in the path of said output beam for removing a portion of said output beam that bears characteristics of the remote reference beam, and preserving a portion of the output beam that bears characteristics of said object beam, wherein said remote reference beam source generates the remote reference beam in overlapping time periods with said object beam and as a pulsed beam, and said filter comprises an optical shutter in the path of the remote reference or output beam, and a shutter control that responds to the remote reference beam source to close the shutter during the remote reference beam pulses and to open the shutter between said pulses.

3. An adaptive optical imaging system, comprising:

a two-beam coupling medium, a remote reference beam source for directing a remote reference beam through an aberrating medium to said coupling medium, a local reference beam source for directing a local reference beam having known phase and intensity characteristics into said beam coupling medium to establish therein a shared hologram with said remote reference beam, and an object beam source for directing a multi-pixel object beam, that contains image information corresponding to an object through said aberrating medium to said hologram on a path similar to said remote reference beam, said object beam diffracting from said two-beam coupling medium into a multi-pixel output beam in the phase conjugate direction of the local reference beam, said output beam retaining said image information, and wherein the pixelized difference in phase and intensity characteristics between the output beam and the local reference beam corresponds to the pixelized difference in phase and intensity characteristics between the object beam and the remote reference beam, said local reference beam and said remote reference beam establishing said shared hologram independent of said object beam, wherein said object beam source provides said object beam as a broadband beam having a plurality of narrow band components, and said remote and local reference beam sources comprise respective pluralities of remote and local beam sources at said narrow bands, further comprising a beam divider for dividing said remote reference and object beams by said narrow bands onto separate portions of said two-beam coupling medium, said local reference beam sources directing local reference beams at said narrow bands to said separate locations of said two-beam coupling medium to establish separate shared holograms with the remote reference beams which have common narrow bands.

4. The adaptive optical imaging system of claim 3, said two-beam coupling medium comprising separate media for each of said shared holograms.

5. The adaptive optical imaging system of claim 3, further comprising a beam combiner for combining the output beams from each of said shared holograms.

6. A method of compensating for aberrations imparted to a multi-pixel object beam, that contains image information corresponding to an object, during transit through an aberrating medium, comprising:

directing a remote reference beam through said aberrating medium on a path similar to the object beam's path and onto a two-beam coupling medium, forming a shared hologram in said two-beam coupling medium between said remote reference beam and a local reference beam that has known phase and intensity characteristics, and directing said object beam onto said hologram to generate a multi-pixel output beam from said two-beam mixing medium with said image information, and with phase and intensity characteristics, relative to the local reference beam's known phase and intensity characteristics, that correspond to the differences in phase and intensity characteristics between the object beam and the remote reference beam, said local reference beam and said remote reference beam establishing said shared hologram independent of said object beam, wherein said aberrating medium has a characteristic frequency at which its degree of aberration varies, and said remote reference beam is pulsed at a frequency higher than the aberrating medium's characteristic frequency to refresh said hologram at said higher frequency.

7. A cleanup method for a multi-pixel object beam that contains image information corresponding to an object, and that has been transmitted through an aberrating medium, comprising:

establishing a double pumped phase conjugate mirror (DPCM) by mixing, with a local reference beam, a remote reference beam that has been transmitted through the aberrating medium along a path similar to the object beam, and directing said object beam onto said DPCM at substantially the same angle as said remote reference beam to generate a multi-pixel output beam in the phase conjugate direction of said local reference beam, said output beam retaining said image information, and having phase and intensity characteristics relative to said local reference beam that correspond to the differences in the phase and intensity characteristics between said object and remote reference beams, said local reference beam and said remote reference beam establishing said shared hologram independent of said object beam, wherein said aberrating medium has a characteristic frequency at which its degree of aberration varies, and said remote reference beam is pulsed at a frequency higher than the aberrating medium's characteristic frequency.

8. An adaptive imaging system, comprising:

a two-beam coupling medium, a remote reference beam source for directing a remote reference beam through an aberrating medium to said coupling medium, a local reference beam source for directing a local reference beam having known phase characteristics into said beam coupling medium to establish therein a shared hologram with said remote reference beam, and an object beam source for directing a multi-pixel object beam through said aberrating medium to said hologram on a path similar to said remote reference beam, said two-beam coupling medium responding to said object beam with a multi-pixel output beam in the phase conjugate direction of the local reference beam, with the pixelized difference in phase characteristics between the output beam and the local reference beam corresponding to the pixelized difference in phase characteristics between the object beam and the remote reference beam, wherein said aberrating medium has a characteristic frequency at which its degree of aberration varies, and said remote reference beam source pulses the remote reference beam at a frequency higher than the aberrating medium's characteristic frequency to refresh said hologram at said higher frequency.

9. An adaptive imaging system, comprising:

a two-beam coupling medium, a remote reference beam source for directing remote reference beam pulses through an aberrating medium to said coupling medium, a local reference beam source for directing a local reference beam having known phase characteristics into said beam coupling medium to establish therein a shared hologram with said remote reference beam, an object beam source for directing a multi-pixel object beam through said aberrating medium to said hologram on a path similar to said remote reference beam, said two-beam coupling medium responding to said object beam with a multi-pixel output beam in the phase conjugate direction of the local reference beam, with the pixelized difference in phase characteristics between the output beam and the local reference beam corresponding to the pixelized difference in phase characteristics between the object beam and the remote reference beam, and a filter in the path of said output beam for removing a portion of said output beam that bears characteristics of the remote reference beam, and preserving a portion of the output beam that bears characteristics of said object beam, said filter comprising an optical shutter in the path of the remote reference or output beam, and a shutter control that responds to the remote reference beam source to close the shutter during the remote reference beam pulses and to open the shutter between said pulses, said remote reference beam source generating said remote reference beam pulses in overlapping time periods with said object beam.

10. An adaptive imaging system, comprising:

a two-beam coupling medium, a remote reference beam source for directing a remote reference beam through an aberrating medium to said coupling medium, a local reference beam source for directing a local reference beam having known phase characteristics into said beam coupling medium to establish therein a shared hologram with said remote reference beam, and an object beam source for directing a multi-pixel object beam through said aberrating medium to said hologram on a path similar to said remote reference beam, said two-beam coupling medium responding to said object beam with a multi-pixel output beam in the phase conjugate direction of the local reference beam, with the pixelized difference in phase characteristics between the output beam and the local reference beam corresponding to the pixelized difference in phase characteristics between the object beam and the remote reference beam, wherein said object beam source provides said object beam as a broadband beam having a plurality of narrow band components, and said remote and local reference beam sources comprise respective pluralities of remote and local reference beam sources at said narrow bands, further comprising a beam divider for dividing said remote reference and object beams by said narrow bands onto separate portions of said two-beam coupling medium, said local reference beam sources directing local reference beams at said narrow bands to said separate portions of said two-beam coupling medium to establish separate shared holograms with the remote reference beams which have common narrow bands.

11. The adaptive optical imaging system of claim 10, said two-beam coupling medium comprising separate media for each of said shared holograms.

12. The adaptive optical imaging system of claim 10, further comprising a beam combiner for combining the output beams from each of said shared holograms.

13. A method of compensating for aberrations imparted to a multi-pixel object beam during transit through an aberrating medium, comprising:

directing a remote reference beam through said aberrating medium on a path similar to the object beam's, and onto a two-beam coupling medium, forming a shared hologram in said two-beam coupling medium between said remote reference beam and a local reference beam that has a known phase characteristic, and directing said object beam onto said hologram to generate a multi-pixel output beam from said two-beam coupling medium with a phase characteristic, relative to the local reference beam's known phase characteristic, that corresponds to the difference in phase characteristics between the object beam and the remote reference beam, wherein said aberrating medium has a characteristic frequency at which its degree of aberration varies, and said remote reference beam is pulsed at a frequency higher than the aberrating medium's characteristic frequency to refresh said hologram at said higher frequency.

14. A cleanup method for a multi-pixel object beam that has been transmitted through an aberrating medium, comprising:

establishing a double pumped phase conjugate mirror (DPCM) by mixing, with a local reference beam, a remote reference beam that has been transmitted through the aberrating medium along a path similar to the object beam with a local reference beam, and directing said object beam onto said DPCM at substantially the same angle as said remote reference beam to generate a multi-pixel output beam in the phase conjugate direction of said local reference beam, said output beam having phase and intensity characteristics relative to said local reference beam that correspond to the differences in the phase and intensity characteristics between said object and remote reference beams, wherein said aberrating medium has a characteristic frequency at which its degree of aberration varies, and said remote reference beam is pulsed at a higher frequency than the aberrating medium's characteristic frequency.

15. An adaptive imaging system for imaging an object, comprising:

a two-beam coupling medium, a remote reference beam source for directing a remote reference beam through an aberrating medium to said coupling medium, a local reference beam source for directing a local reference beam having known phase and intensity characteristics into said beam coupling medium to establish therein a shared hologram with said remote reference beam, said two-beam coupling medium responding to said local and remote reference beams with a conjugate beam in the phase conjugate direction of said remote reference beam, said conjugate beam being reflected back by a glint feature on the object towards said two-beam coupling medium to assist in forming said remote reference beam, and an object beam source for directing a multi-pixel object beam through said aberrating medium to said hologram on a path similar to said remote reference beam, said object beam diffracting from said two-beam coupling medium into a multi-pixel output beam in the phase conjugate direction of the local reference beam, with the pixelized difference in phase and intensity characteristics between the output beam and the local reference beam corresponding to the pixelized difference in phase and intensity characteristics between the object beam and the remote reference beam, said local reference beam and said remote reference beam establishing said shared hologram independent of said object beam.

16. The adaptive optical imaging system of claim 15, wherein the remote reference beam source comprises a local laser source that is oriented to direct a laser beam through said aberrating medium to illuminate said glint feature on the object, and thereby initiate said remote reference beam with a reflection of said laser beam off said glint feature.

17. An adaptive imaging system, comprising:

a two-beam coupling medium, a remote reference beam source for directing a remote reference beam through an aberrating medium to said coupling medium, said aberrating medium comprising a first fiber set consisting of at least one optical fiber, and further comprising a polarization compensator in the optical path between said fibers and two-beam coupling medium to compensate for depolarizations introduced by said fibers, a local reference beam source for directing a local reference beam having known phase and intensity characteristics into said beam coupling medium to establish therein a shared hologram with said remote reference beam, and an object beam source for directing a multi-pixel object beam through said aberrating medium to said hologram on a path similar to said remote reference beam, said object beam diffracting from said two-beam coupling medium into a multi-pixel output beam in the phase conjugate direction of the local reference beam, with the pixelized difference in phase and intensity characteristics between the output beam and the local reference beam corresponding to the pixelized difference in phase and intensity characteristics between the object beam and the remote reference beam, said local reference beam and said remote reference beam establishing said shared hologram independent of said object beam.

18. The adaptive optical imaging system of claim 17, wherein said remote and local reference beams form shared gratings in said two-beam coupling medium, further comprising a second fiber set consisting of at least one optical fiber in the optical path between said local reference beam source and said two-beam coupling medium to increase the number of said shared gratings.

19. An adaptive optical imaging system, comprising:

a two-beam coupling medium, wherein said two-beam coupling medium has a grating response time, a remote reference beam source for directing a remote reference beam through an aberrating medium to said coupling medium, a local reference beam source for directing a local reference beam having known phase and intensity characteristics into said beam coupling medium to establish therein a shared hologram with said remote reference beam, wherein said remote and local reference beam sources generate said remote and local reference beams in non-overlapping time periods, so that said remote and local reference beams are temporally segregated from each other at said coupling medium by an amount that does not exceed said grating response time, and an object beam source for directing a multi-pixel object beam, that contains image information corresponding to an object, through said aberrating medium to said hologram on a path similar to said remote reference beam, said object beam diffracting from said two-beam coupling medium into a multi-pixel output beam in the phase conjugate direction of the local reference beam, said output beam retaining said image information, and wherein the pixelized difference in phase and intensity characteristics between the output beam and the local reference beam corresponds to the pixelized difference in phase and intensity characteristics between the object beam and the remote reference beam, said local reference beam and said remote reference beam establishing said shared hologram independent of said object beam.

20. A method of compensating for aberrations imparted to a multi-pixel object beam, that contains image information corresponding to an object, during transit through an aberrating medium, comprising:

directing a remote reference beam through said aberrating medium on a path similar to the object beam's path and onto a two-beam coupling medium, wherein said coupling medium has a grating response time, forming a shared hologram in said two-beam coupling medium between said remote reference beam and a local reference beam that has known phase and intensity characteristics, said remote and local reference beams being temporally segregated at said coupling medium by an amount that does not exceed the grating response time of such coupling medium, and directing said object beam onto said hologram to generate a multi-pixel output beam from said two-beam mixing medium with said image information, and with phase and intensity characteristics, relative to the local reference beam's known phase and intensity characteristics, that correspond to the differences in phase and intensity characteristics between the object beam and the remote reference beam, said local reference beam and said remote reference beam establishing said shared hologram independent of said object beam.

21. A cleanup method for a multi-pixel object beam that contains image information corresponding to an object, and that has been transmitted through an aberrating medium, comprising:

establishing a double pumped phase conjugate mirror (DPCM) by mixing, with a local reference beam, a remote reference beam that has been transmitted through the aberrating medium along a path similar to the object beam, and directing said object beam onto said DPCM at substantially the same angle as said remote reference beam to generate a multi-pixel output beam in the phase conjugate direction of said local reference beam, said output beam retaining said image information and having phase and intensity characteristics relative to said local reference beam that correspond to the differences in the phase and intensity characteristics between said object and remote reference beams, said local reference beam and remote reference beam establishing said shared hologram independent of said object beam.

wherein said DPCM has a grating response time, and said remote and local reference beams are temporarily segregated at said DPCM by an amount that does not exceed the grating response time of the DPCM.

* * * * *